US012026422B2

(12) United States Patent
Chandrashekar et al.

(10) Patent No.: US 12,026,422 B2
(45) Date of Patent: Jul. 2, 2024

(54) SHARED VIEWING EXPERIENCE ENHANCEMENT

(71) Applicant: Rovi Guides, Inc., San Jose, CA (US)

(72) Inventors: Padmassri Chandrashekar, Karnataka (IN); Daina Emmanuel, Bangalore (IN); Akshay Chetan Shah, Mumbai (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/363,767

(22) Filed: Jun. 30, 2021

(65) Prior Publication Data

US 2023/0004339 A1 Jan. 5, 2023

(51) Int. Cl.
*G06F 3/14* (2006.01)
*G06T 11/00* (2006.01)
*H04L 51/046* (2022.01)

(52) U.S. Cl.
CPC ............ *G06F 3/1462* (2013.01); *G06T 11/00* (2013.01); *H04L 51/046* (2013.01)

(58) Field of Classification Search
None
See application file for complete search history.

(56) References Cited

U.S. PATENT DOCUMENTS

| 2010/0037277 | A1* | 2/2010 | Flynn-Ripley | H04W 4/12 725/116 |
| 2015/0121251 | A1* | 4/2015 | Kadirvel | H04W 4/12 715/753 |
| 2017/0246545 | A1* | 8/2017 | Wilhite | H04L 12/1859 |
| 2018/0054466 | A1* | 2/2018 | Blattner | H04L 51/04 |

FOREIGN PATENT DOCUMENTS

CN 109474512 B * 11/2021 ............. G06F 9/451

* cited by examiner

*Primary Examiner* — Yi Wang
(74) *Attorney, Agent, or Firm* — Haley Guiliano LLP

(57) ABSTRACT

Methods and systems are provided for receiving media content for display in a shared activity session; receiving additional content corresponding to respective users of one or more other user equipment devices participating in the shared activity session; generating for display, using control circuitry, a display screen including the media content and at least some of the additional content; and, during the shared activity session, automatically adapting the display of the additional content using the control circuitry based on the media content and/or the additional content. For example, images, avatars or video of the users displayed alongside the media content may be adapted using backgrounds or filters reflecting the media content; additional content, such as audio or chat messages, provided by those users; and/or information in their user profiles. The shared activity may be, for example, a group watch session, a videoconference, videocall, audio call, chat session or multi-player game session.

19 Claims, 6 Drawing Sheets

SHARED VIEWING EXPERIENCE ENHANCEMENT

BACKGROUND

Embodiments of the disclosure relate generally to methods and systems for shared viewing activities, such as group video calls, videoconferences, chats, messaging, group watch sessions and multi-player games.

Communication technology has developed to such an extent that videocalling and videoconferences are now commonplace. This permits virtual meetings between hundreds of participants at different locations, allowing them to communicate with one another using audio and video. Such meetings may also provide messaging and chat functions, allow the users to view presentations and media content together, and to screen-share.

Group watch applications allow users at different locations to watch live or on-demand media content online together. For example, a group of friends might like to watch a sports event or movie together but cannot gather in the same physical location due to travelling distances between their locations and/or restrictions on indoor gatherings. While it may be possible to use screen-sharing or videoconferencing to allow a group of viewers at different locations to watch the same content together, dedicated group watch applications and functionality have become available. Some degree of synchronization between the playback of the content on the devices used by the viewers to view the content is provided, for example, using a group watch application implemented on the viewers' respective media devices. In particular, playback operations instigated by one or more of the viewers, such as pausing, rewinding, fast-forwarding or skipping content, is replicated in the playback of the content to the other viewers in the group.

SUMMARY

Embodiments of this disclosure include methods and systems for enhancing an online shared viewing session. Such methods and systems may use a shared viewing application implemented on user devices. The shared viewing application may be a stand-alone application, such as a group watching application, or may be a software module that is part of another application, such as an interactive television application, media guidance application, videocall application, videoconferencing application, or a multi-player game, in which images, avatars or video of one or more participants are displayed alongside the content being viewed.

The shared viewing application or software module adapts the images, avatars or videos during the shared viewing session. The adaptation may include changing a background shown in an image, avatar or video of a participant, putting an image filter or video filter over an image, avatar or video of a participant, adding a visual effect to an image corresponding to a participant in an audio call or message-based chat, or changing a display profile of a participant in an audio call or message based chat, for example, by changing display attributes, such as color, font, emojis or icons, in the display of messages from a participant in a message-based chat activity.

The adaptations may be based on media content being viewed by the group. For example, the shared viewing application or software module may select a frame from the media content and use that frame as a background to still or video images of some, or all, of the participants. In another example, a background may be selected to complement the media content, such as an image or an advertisement of a product or location featured in, or similar to an object, plot line, subject or location shown in the media content. Further adaptations may be made during the session, to update the background based on other frames, objects or locations in the media content.

Another example of an adaptation is placing, or changing, a video filter to modify the appearance of the video images of some, or all, of the participants. Such filters may be selected to correspond to persons, characters, teams, events or locations in the media content or game.

The shared viewing session may be a group watch session, in which media content is played to the participants on respective user equipment devices. The playback of media content is synchronized between the multiple user equipment devices, and playback operations requested by one or more of the participants, such as pausing, rewinding, skipping, fast-forwarding and/or other trickplay functions, are performed by all of the user equipment devices. The media content may be live media content or on-demand media content. Video or still images corresponding to some or all of the participants are displayed alongside the media content, for example in a gallery of images, and adapted in the manner described above.

The shared viewing session may be a videocall or videoconference, in which case video of one or more of the participants is displayed to the other participants and adapted in the manner described above. Optionally, other content, such as a presentation or a screen-share, may be displayed alongside the video of the other participants.

The shared viewing session may be a multi-player game in which images, avatars or videos of at least some of the players are displayed alongside game content and adapted in the manner described above.

In a message-based chat application provided separately to, or alongside, viewing of media content or any of the applications described above, adaptations to the display profile of a participant may be made based on content of the messages exchanged between the participants, for example by adding a background or filter to an image of the participant, or changing display attributes for their messages.

The adaptation may be based on the media content, as in the examples mentioned above. The adaptation may also, or instead, be based on a context such as a subject or keyword in a discussion or chat between participants, information in the user profiles of one or more participants, or other information. For example, the adaptations may be based on additional content provided by the participants, such as chat messages exchanged between participants during the session or audio input from the participants during the session. If the participants in a group watch session are watching a basketball game between two teams, the Nets and the Heat, and audio input from one participant indicates that they are cheering one particular team, their image, video or avatar may be adapted with a background or filter corresponding to that team. In another example, if user profile information of one participant may indicate that they support a particular sports team, then a video filter and/or background reflecting their support for that team may be applied to a video of that participant, such as a team emblem or shirt during a group watch session of a match involving that team. Alternatively, or additionally, a filter and/or background depicting a celebration may be applied to the video of that participant in response to points being scored by that team. Another option would be to provide an adaptation that presents team merchandise or an advertisement for products associated with the team or their sponsors.

The adaptations may be triggered by detection of an event in the session, such as a goal in a sports event or a particular scene in a television program or film; detection of an event, tag or marker in the media content; detection of an event or keyword in chat messages; or audio input from the participants. Alternatively, or additionally, adaptations may be applied periodically, for example, at preset or variable time intervals, during commercial breaks in the media content.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

Example methods and systems for transmitting user feedback and actions in a shared viewing activity will now be described.

Figure 1:
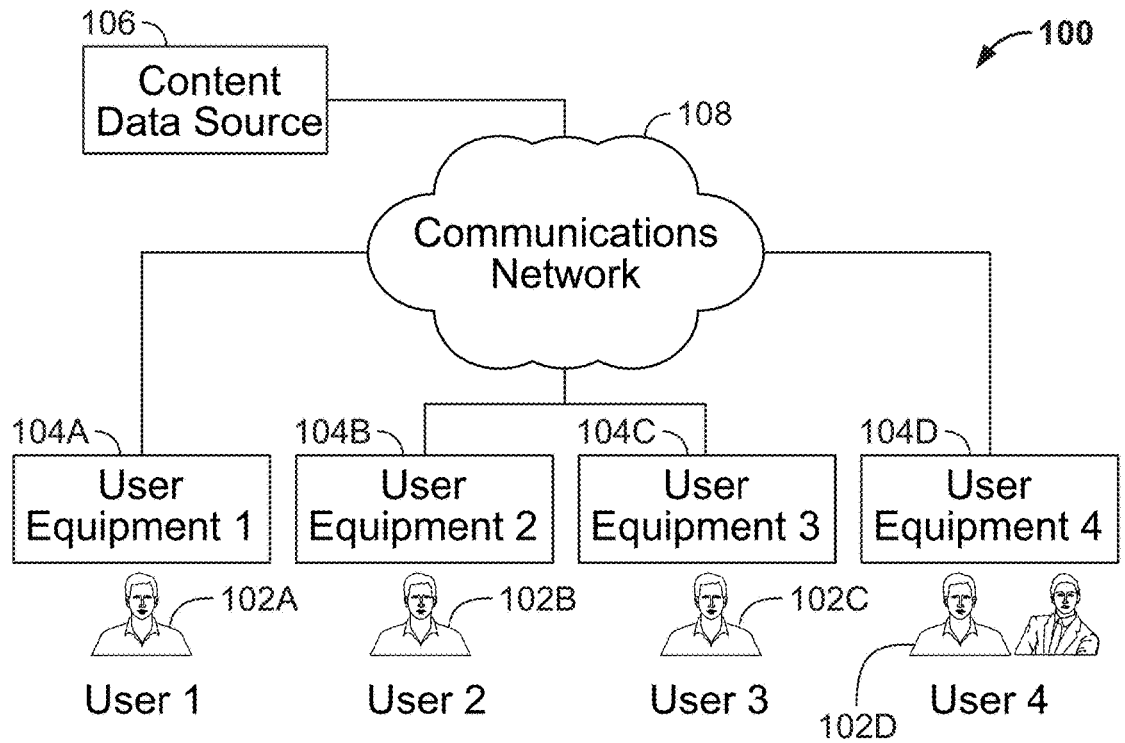
FIG. 1 depicts a system for providing a shared viewing activity in accordance with some embodiments.

FIG. 1 depicts an example of a system 100 for providing shared viewing of media content in accordance with an embodiment in which a group of users 102a-d are watching media content on respective user equipment devices 104a-d. Examples of suitable user equipment devices 104a-d include, but are not limited to, a smart television, a tablet device, a smartphone, a device such as a set-top box or streaming device connected to a display device, a 3D headset or virtual reality display equipment.

The user equipment devices 104a-d receive the same media content from a content source 106 via a communication network 108. In this example, the communications network is the Internet. Examples of content sources 106 include video-on-demand servers, streaming services, network digital video recorders or other devices that can communicate with the user equipment devices 104a-d via the network 108. Examples of media content include a television program, a recording of media content, streamed media content or an online video game.

The example shown in FIG. 1 includes only one communication network 108, through which the user equipment devices 104a-d can receive the media content and communicate with one another. In another embodiment, the user equipment devices 104a-d may receive the media content via a first communications network, such as a cable or broadcast network, and communicate with each other via a second communication network, such as the Internet.

Figure 2:
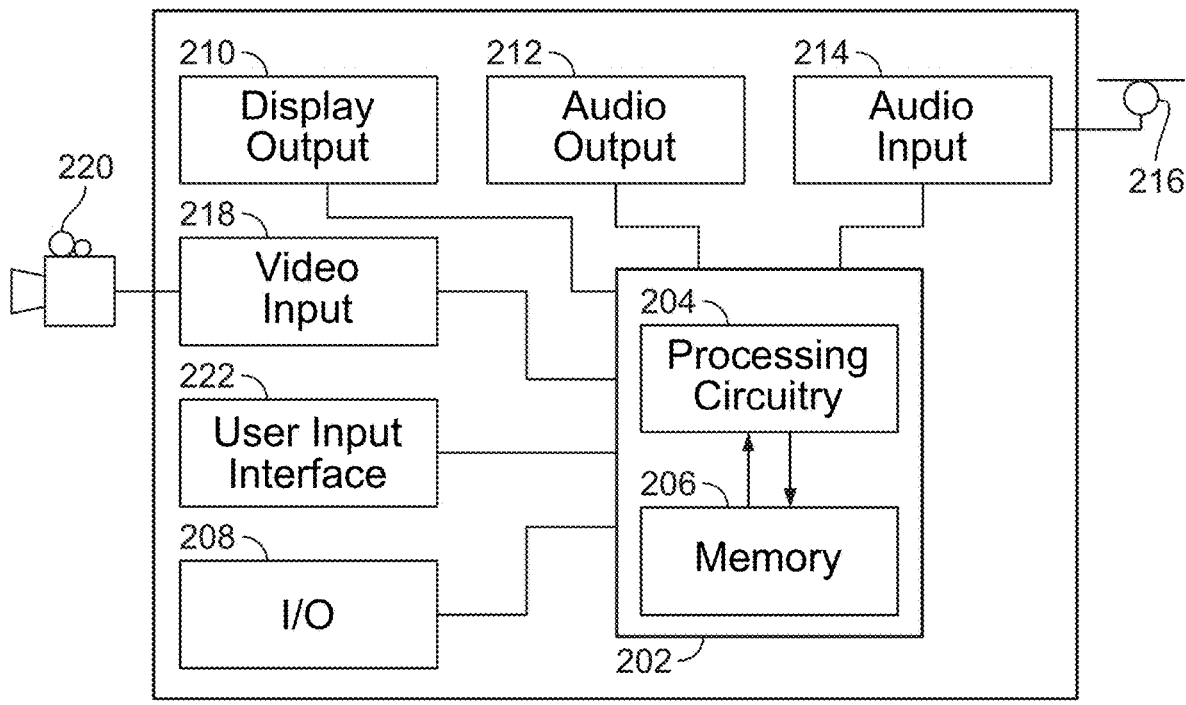
FIG. 2 is a block diagram of a user equipment device in the system of FIG. 1.

An example of a user equipment device 200 for use in the system 100 is depicted in FIG. 2. The user equipment device 200 includes control circuitry 202 that comprises processing circuitry 204 and a memory 206 that stores, at least, a computer program that, when executed by the processing circuitry 204, provides a shared viewing application. The processing circuitry 204 may be based on one or more microprocessors, microcontrollers, digital signal processors, programmable logic devices, etc. The memory 206 may be random-access memory, read-only memory, or any other suitable memory.

The control circuitry 202 is arranged to receive media content via the communication network 108 through input/output path 208, and generates for display a video component of the media content. In addition, the control circuitry 202 is arranged to generate and send data conveying reactions of the user of the user equipment device 200 to other users in the group and to receive, and generate for display, data conveying user reactions from other user equipment devices 104b-d in the group via the input/output path 208.

The control circuitry 202 is arranged to provide the video component and received data conveying the reactions of other users for display via display output 210. The display output 210 may be configured to be connected, via a wired or wireless connection, to an external display device, such as a television or monitor (not shown), or may be an integrated display, such as a touch-screen display.

The control circuitry 202 is also arranged to generate for output, via audio output 212, an audio component of the media content. The display output 210 may be configured to be connected, via a wired or wireless connection, to an external audio output device, such as a television, monitor, speaker or headphones (not shown), and/or one or more speakers integrated into the user equipment device 200.

The control circuitry 202 is also arranged to receive input from a plurality of sensors. In the example shown in FIG. 2, the user equipment device 200 includes a microphone input 214 that is arranged to receive audio input signals via an integrated or external microphone 216. The control circuitry 202 is also arranged to receive still and/or video images via at least one input 218 from a respective camera 220. The camera 220, or cameras, may be integrated into the user equipment device 200, external cameras connected to the user equipment device 200, or a combination thereof.

The user equipment device 200 also includes a user input interface 222 for receiving commands and requests from a user, for example, to control playing and selection of media content using a remote control device (not shown). Such a remote control device may be connected to the user equipment device 200 via a wireless connection, such as an infra-red, Wi-Fi, Bluetooth or other suitable connection. Alternatively, or additionally, the microphone 216 and microphone input 214 may be used to receive voice input for controlling the user equipment device 200, in which case the processing circuitry 204 may perform natural language processing to determine the user's command from the voice input and perform a corresponding action.

Figure 3A:
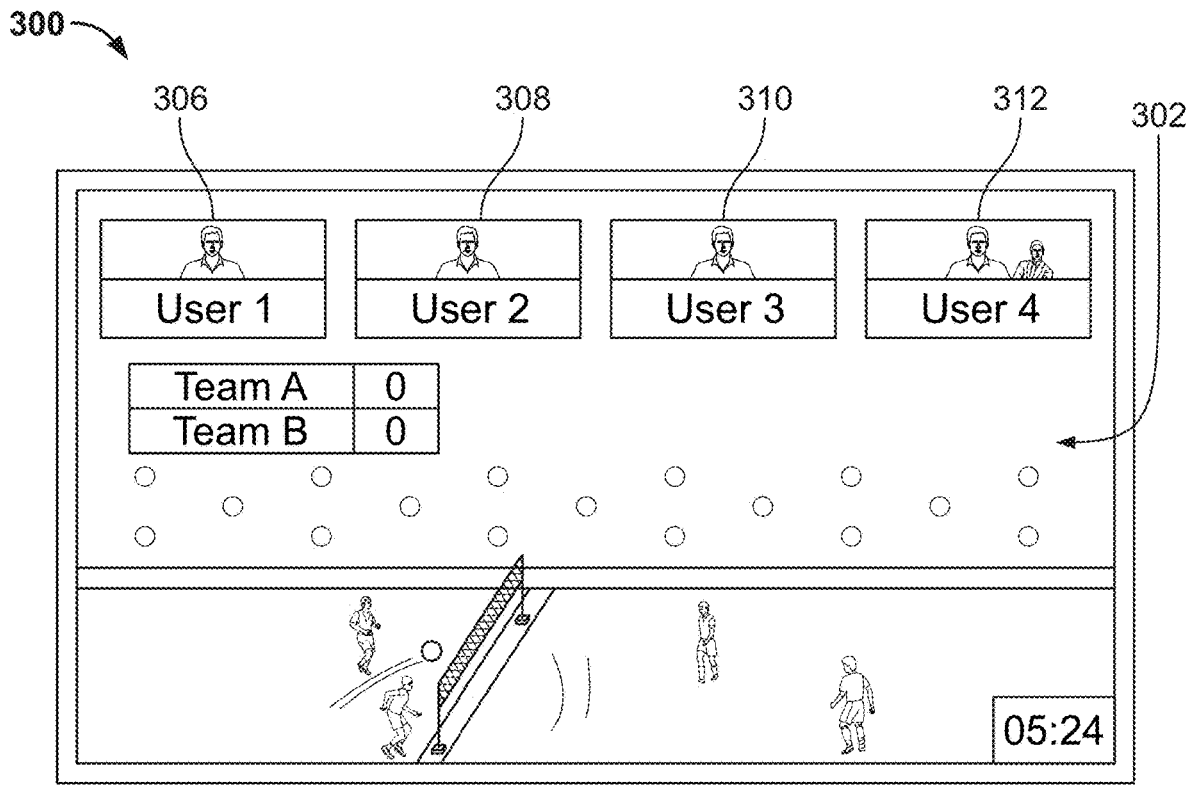
FIG. 3A depicts an example of a display of media content in a shared viewing activity.

FIG. 3A depicts an example of a display screen for use in a shared viewing experience, according to some embodiments. In this example, a group of users are participating in a group watch session of media content in the form of a volleyball match. The display screen, shown on a user equipment device 300, presents the media content in a main display portion 302 and a gallery 304 of images 306, 308, 310, 312 showing video, still images or avatars of the users in the group.

Figure 3B:
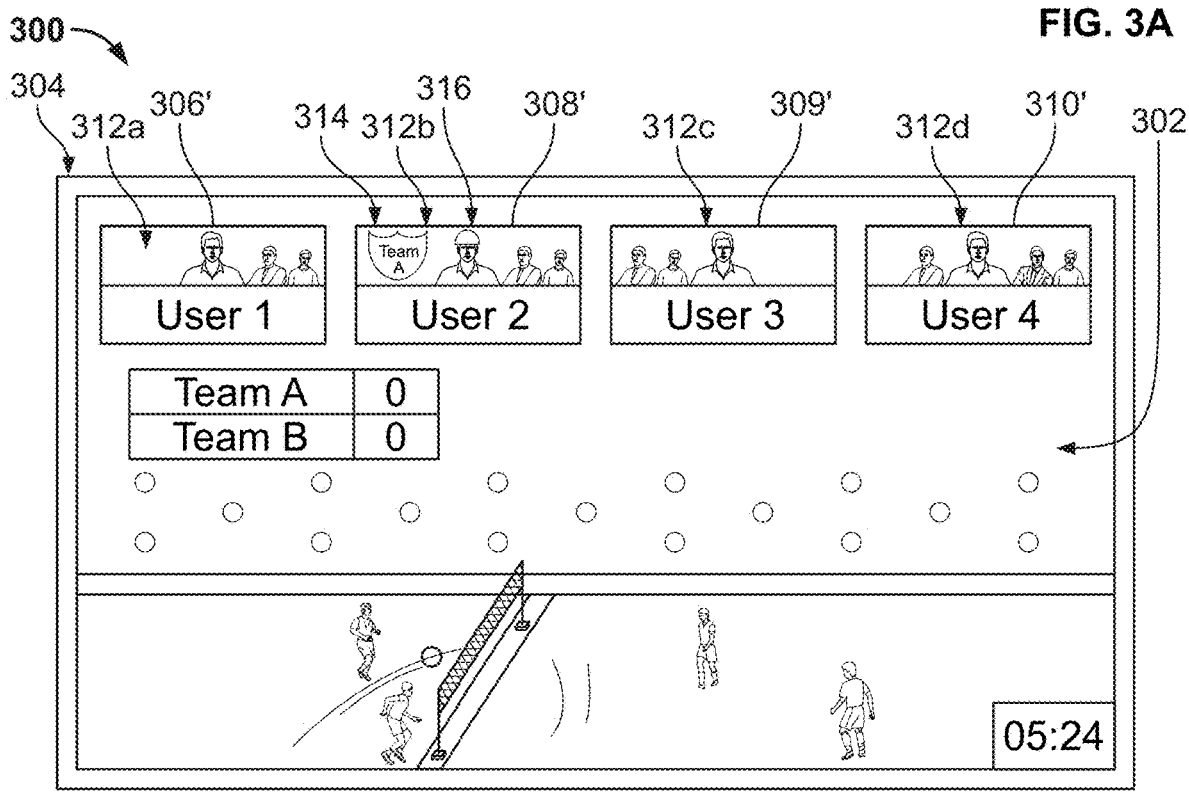
FIG. 3B depicts an example of an adapted display of media content in a shared viewing activity.

FIG. 3B depicts an example in which the display screen shown in FIG. 3A is adapted based on the media content and/or additional content. The images 306', 308', 310', 312' of users 1-4 have been adapted by adding backgrounds 312a, 312b, 312c, 312d associated with the media content. In this example, the backgrounds 312a, 312b, 312c, 312d show a crowd at a match, so that it appears as if the users are part of the crowd watching the match. This may give the users a greater degree of immersion in the media content.

Also in the example of FIG. 3B, the image 308' of one user, user 2, is adapted with a video filter that adds to the image 308 a team badge 314 and beanie hat 316 associated with one of the teams, Team A, taking part in the match. These further adaptations may be based on user profile information of user 2 indicating that they support Team A, or a chat message or audio input from user 2 indicating their support for Team A. The filter may be applied in response to a determination that the match involves Team A, for example, based on metadata for the media content or closed caption data of the media content, where user's 2's support of Team A is known from user 2's profile in an interactive television application, social network, or social media posts by user 2. The filter may be applied, or updated, in response to detecting keywords relating to Team A or Team A players extracted from chat or audio messages from user 2, or triggered by a determination that a cheering pattern of user 2 gleaned from analyzing audio input from user 2 indicates that user 2 cheers in response to events favoring Team A.

Figure 4:
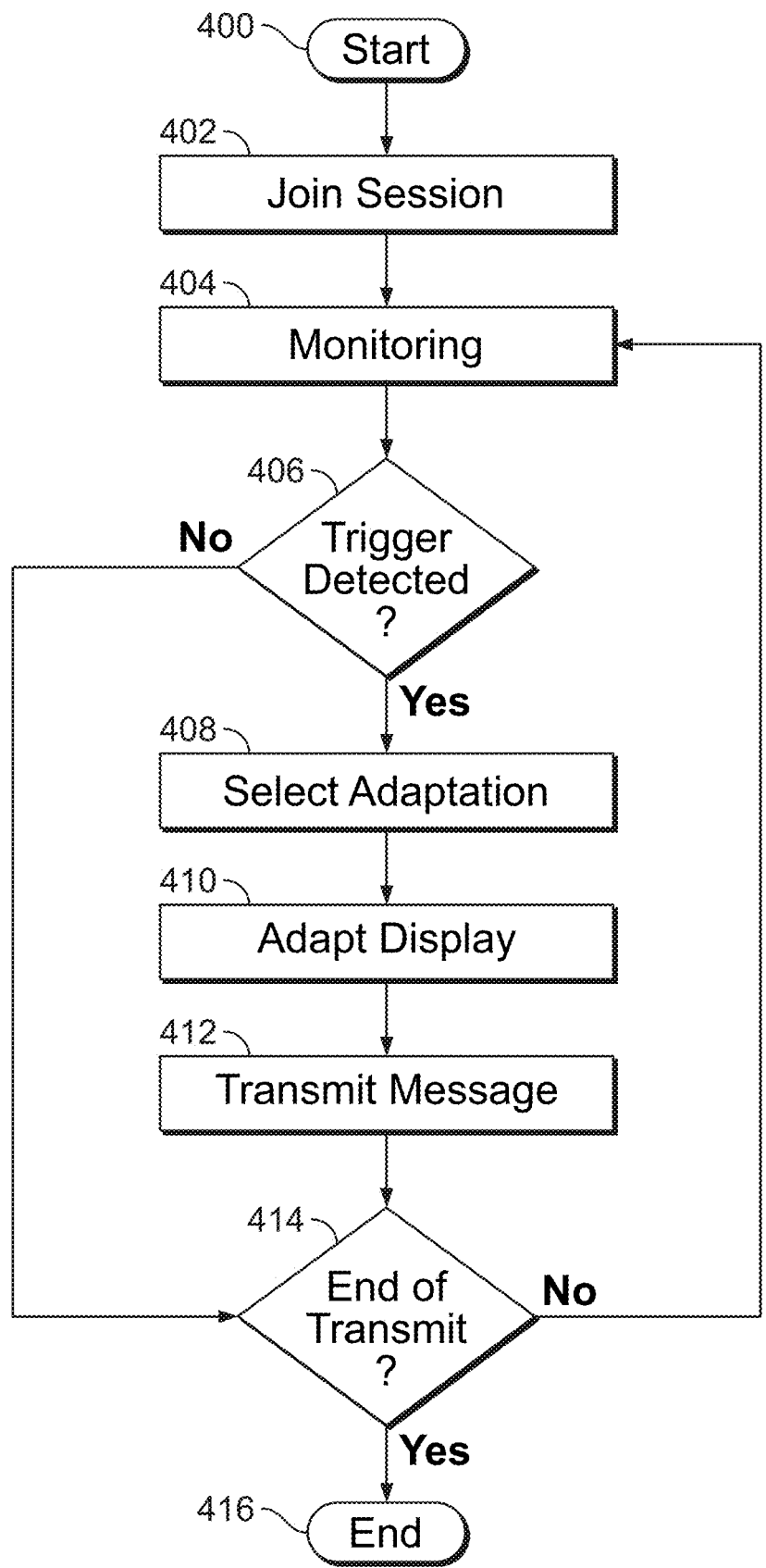
FIG. 4 is a flowchart of a method for adapting display of media content in a shared viewing activity according to an embodiment.

FIG. 4 is a flowchart of a process that may be performed by the control circuitry of the user equipment device 300 to adapt the images of one or more of users 1-4. Beginning at step 400, based on an instruction received from a user, for example, through the user input interface or a voice command, the control circuitry of the user equipment 300 causes the user equipment 300 to join a session (step 402) of shared activity, such as a group watch session, multiplayer game session, videoconference, video call, audio call or message-based chat, and begins presenting the media content in that session. The session may be initiated by the control circuitry of the user equipment device 300 based on the instruction or, alternatively, the user equipment device 300 may join an existing group watch session initiated by another user.

In the example shown in FIG. 3A, the user equipment device 300 is presenting a volleyball match to users 1-4 in a group watch session, and more than one user may be viewing the content at any one of the user equipment devices. A video of the user is captured through the camera and transmitted to the other user equipment devices connected to the group viewing session for display in the gallery 304 portion of their respective display screens. Alternatively, a still image or avatar of the user may be presented in the gallery 304. Optionally, audio of the user may be captured through a microphone and transmitted to the other user equipment devices instead of, or as well as, the video of the first user 302, to allow the users to converse with one another, and/or a message-based chat function may be provided.

The control circuitry of the user equipment device 300 monitors the media content and/or additional content provided by the user during the session (step 404). For example, the user equipment device 300 may monitor one or more of closed caption data, audio from the users or chat messages, parsing it to determine keywords associated with the media content and/or users. Alternatively, or additionally, the control circuitry of the user equipment device 300 may monitor metadata within or accompanying the media content to identify keywords relating to the content and/or events, tags or other markers indicating that the display of the media content is to be adapted, such as the beginning of a new scene in the media content or the beginning of a commercial.

At step 406, the control circuitry of the user equipment device 300 determines whether a trigger for adapting the display has been detected. The trigger may be an event within the media content, such as a point being won in the displayed volleyball match or the start of a new program or scene, a tag or marker or a keyword transmitted in metadata or closed caption data. Alternatively, the trigger may be an event in the additional content provided by the user, such as a keyword in audio or message-based chat. In yet another alternative embodiment, the trigger may simply be a time-based trigger, such as a preset time interval.

If no trigger has been detected, then the control circuitry of the user equipment device 300 continues monitoring the content and/or additional content (step 404) until a trigger is detected (step 406) or the session ends (step 414).

If a trigger is detected (step 406), then the control circuitry determines an adaptation to make to the display in the session (step 408). For example, a tag in the media content detected at step 406 may also indicate a type of adaptation, such as a video background or filter, to apply to the images in the gallery 304. Such a tag may include a location, such as a Universal Resource Locator, from which a background image or filter to be used in the adaptation may be retrieved, for example, from the content source 106, or another remote server, via the communication network 108. Alternatively, such a tag or marker may simply indicate a keyword such as a team name or location, and the control circuitry of the user equipment device 300 may conduct a search for suitable images or filters in its memory or stored at local or remote servers to find a corresponding image. In yet another embodiment, an image or filter may be transmitted to the user equipment device 300 alongside the media content. In a further embodiment, a tag, marker or metadata may indicate that some or all of a frame of the content is to be used as a video background and may include an indication of the frame and, optionally, the portion, to be used for this purpose.

The selected adaptation is then applied to the user video, image, avatar or display profile (step 410). The selected adaptation may be applied automatically by the control circuitry of the user equipment device 300. Alternatively, the user equipment device 300 may generate for output a prompt for the user to confirm whether or not the selected adaptation should be applied. The user's response may be received via the user input interface, voice input via the microphone or a positive gesture, such as a "thumbs up" detected through gesture recognition performed on images captured by the camera.

Figure 5:
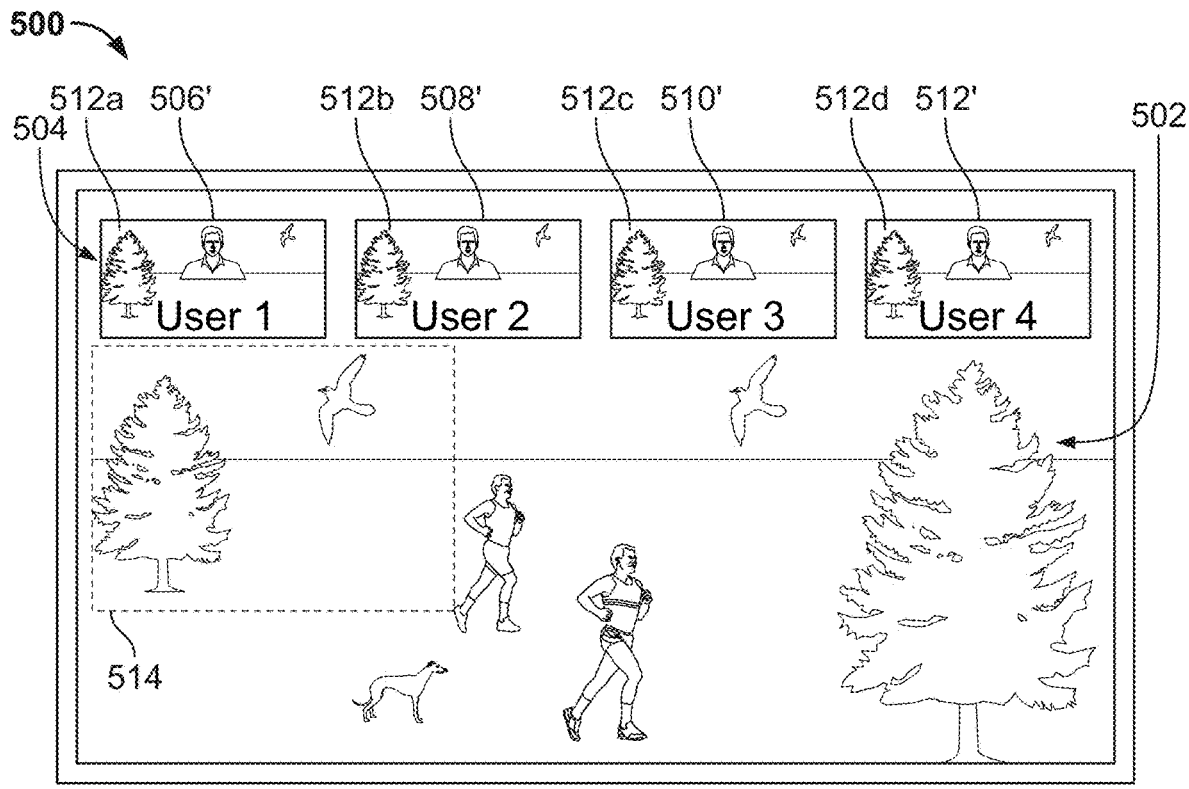
FIG. 5 depicts an example of selecting a background for use in adapting the media content according to an embodiment.

FIG. 5 depicts an example of determining an adaptation in which a portion of a frame of media content is selected for use as a background in step 408. In this example, a tag or other metadata transmitted with, or alongside, the media content 502 identifies a frame, e.g., using a frame number or time stamp within the media content 502, suitable for use as a video background in the gallery 504. Optionally, the tag or metadata may identify a portion 514 of the frame of media content 502, e.g., by specifying coordinates within the frame. The control circuitry of the user equipment device 300 may then determine that the adaptation is to be the use of that portion 514 of the frame as video backgrounds 512a-512d in the images 506', 508', 510', 512' of the users shown in the gallery 504. In the example shown in FIG. 5, the frame of the media content 502 is a countryside scene, and a portion 514 showing the countryside is used as the video backgrounds 512a-512d. In other embodiments, a similar background may be selected based on keywords such as "country", "countryside" or "rural" extracted from closed caption data or metadata of the media content 502 or indicated in a tag within the media content 502. In a similar manner, the crowd image used as in the backgrounds 312a-d shown in FIG. 3B could be portions of a frame of the media content 302. The use of such backgrounds can provide a level of immersion in the media content for the participants in the session.

Figure 6:
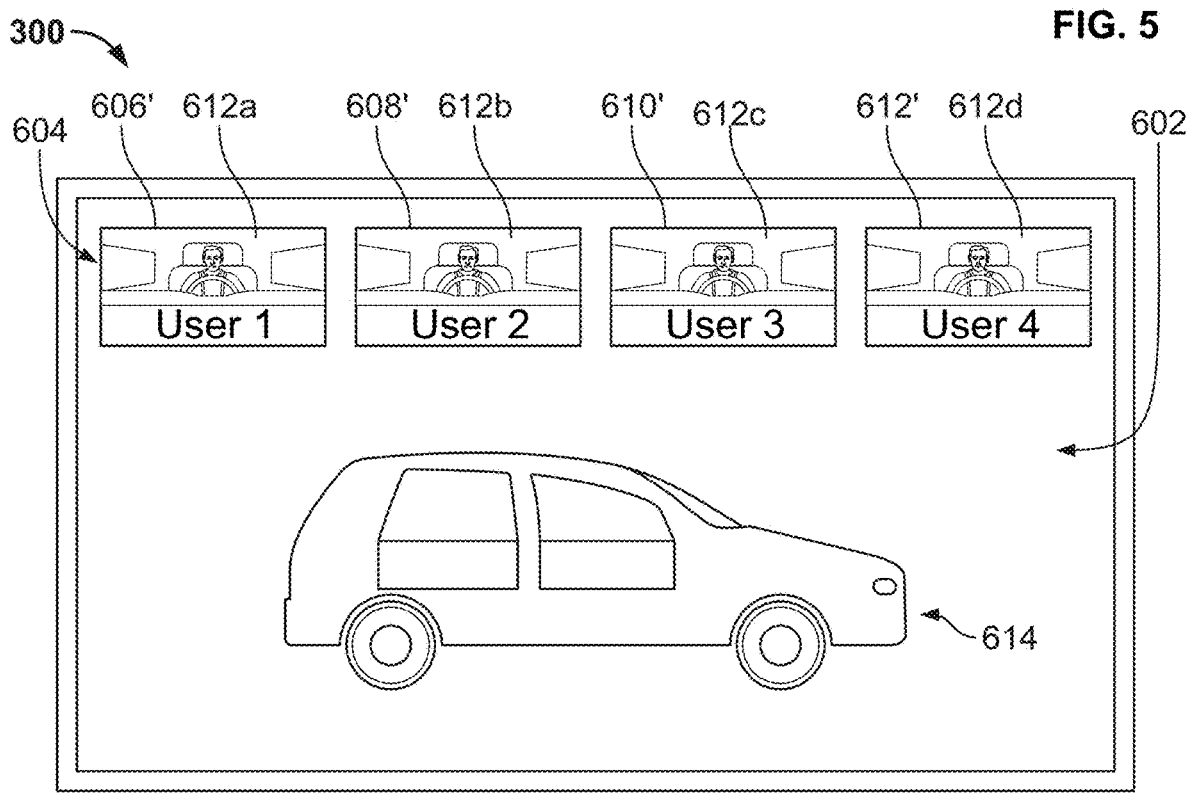
FIG. 6 depicts an example of selecting a background for use in adapting the media content according to another embodiment.

FIG. 6 depicts another example in which a different image is used as the background. In this example, the media content 602 features an image of a car 614, while the backgrounds 612a-d of the user images 606', 608', 610', 612' show the users in the interior of the car. The image of the interior used as the backgrounds 612a-d may be transmitted to the user equipment device 300 alongside the media content 602 or retrieved from a location identified in a tag or metadata embedded in, or accompanying, the media content 602. Such a background may provide a level of immersion, in a similar manner to the adaptations shown in FIGS. 3B and 5. Alternatively, or additionally, such a background 612a-d may supplement the media content 602. For instance, if the media content 602 is an advertisement for a car, the view of the car's interior provided by the backgrounds 612a-d may supplement the information provided by the advertisement.

The adaptation may include a filter or other visual effect applied to a video, image or avatar of the user instead of, or as well as, a background. In the example shown in FIG. 3B, the adapted image 308' of user 2 includes both a filter, resulting in the display of the team badge 314 and beanie hat 316, and a background 312b. Such filters and, optionally, backgrounds, may provide a level of immersion and/or opportunities for advertising items such as team merchandise or sponsors' products.

Figure 7A:
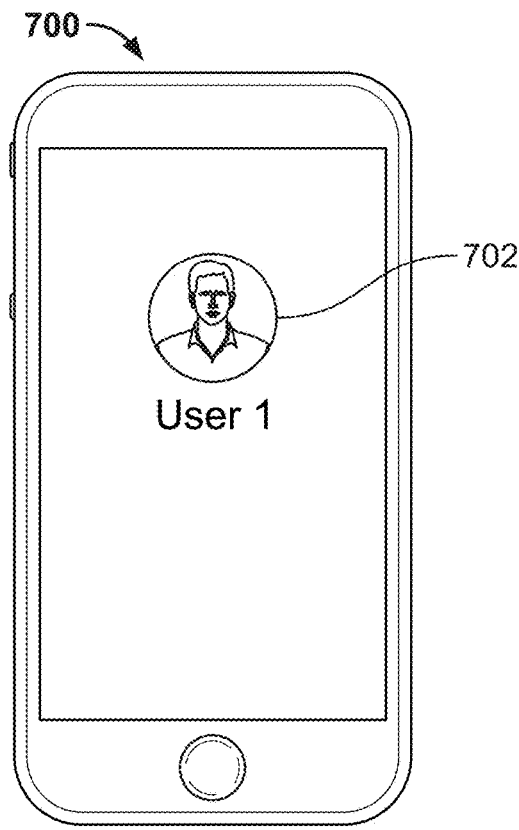
FIGS. 7A, 7B and 7C depict examples of an adapting a display associated with an audio call.
Figure 7B:
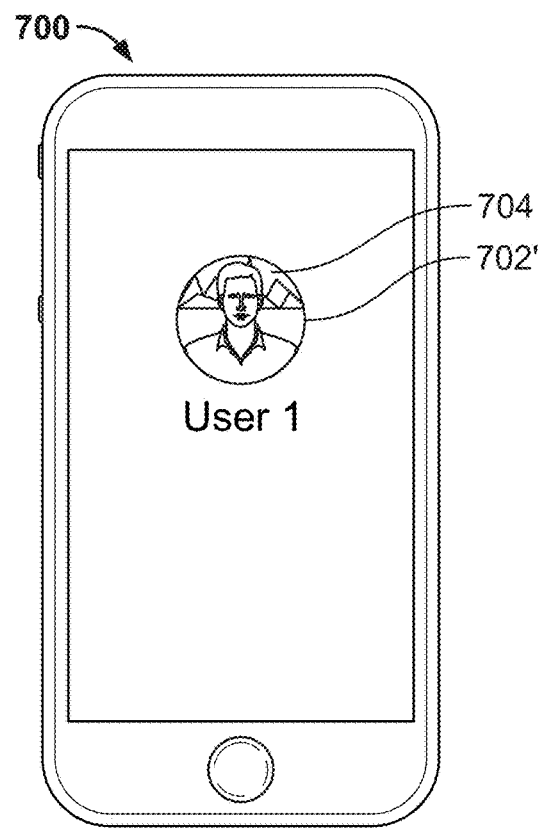
Figure 7C:
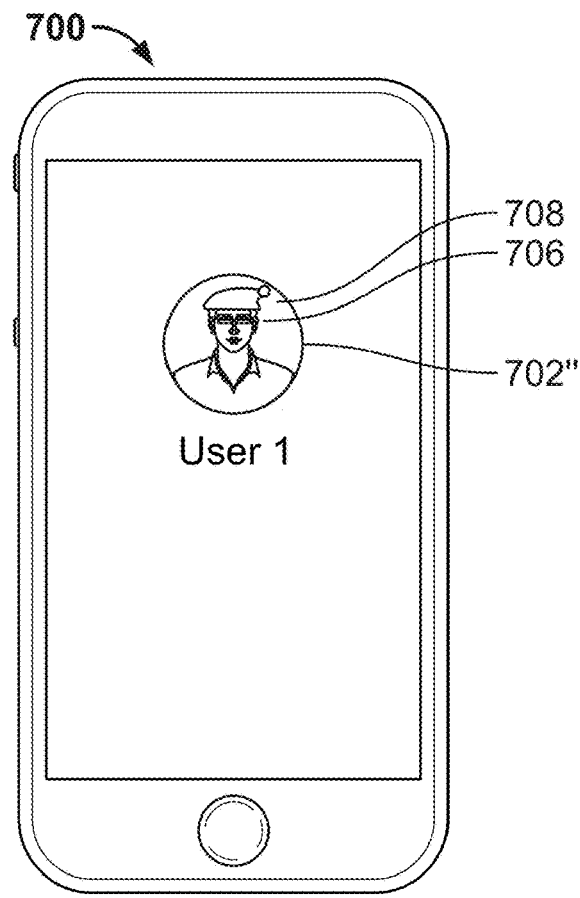

FIG. 7A depicts an example in which the session is an audio call received by user equipment device 700. In this example, the control circuitry of the user equipment device 700 determines, at step 406, an adaptation of an image 702 or avatar associated with one or more other participants in the audio call and may be based on their user profile information and/or subject matter in the audio call. For example, if user 1 were to speak about a skiing holiday, the user equipment device 700 may detect a keyword "skiing" in received audio data, obtain an image of mountains from a search of images stored at local and/or remote servers in step 406. Then, in step 408, the user equipment device 700 may display an adapted image 702' of user 1 that uses the obtained image as a background 704, such as the image of mountains shown in FIG. 7B. Alternatively, or additionally, the user equipment device 700 may search for image filters relevant to skiing in step 406, such as a filter adding ski goggles 706 and a ski hat 708, and display an adapted image 702'' at step 408 in which that filter is applied, as shown in FIG. 7C.

Figure 8:
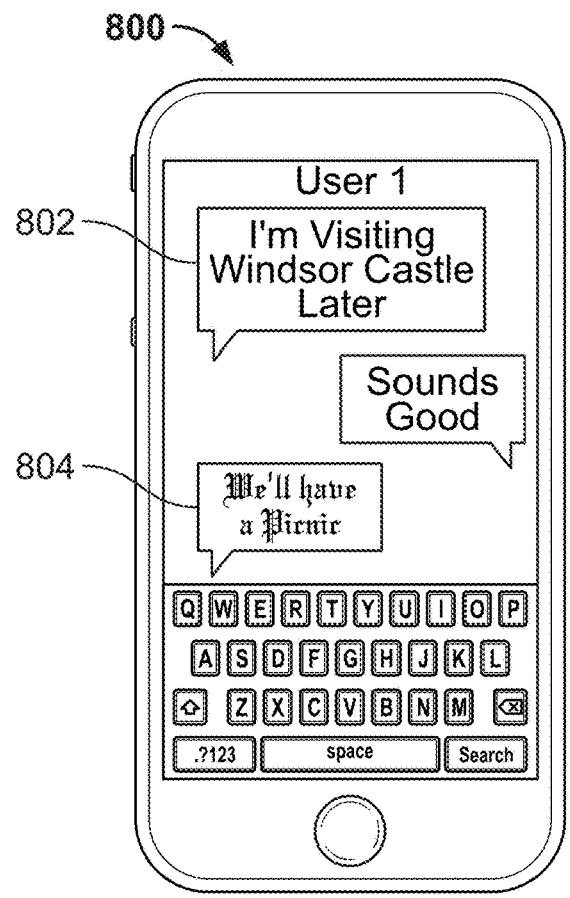
FIG. 8 depicts an example of adapting the media content display of chat messages according to an embodiment.

FIG. 8 depicts a further example in which the shared activity is, or includes, message-based chat displayed by user equipment device 800. In this case, an adjustment to an attribute of the display of the chat messages may be determined based on keywords in the chat at step 406 and that attribute adjusted at step 408, for example, by adjusting the color, size or type of font used to display subsequent messages. In the example shown in FIG. 8, the keyword "castle" in a message 802 from user 1 has triggered an adaptation to display a subsequent message 804 from user 1 in a medieval style font.

Returning to FIG. 4, the user equipment 300 may, optionally, transmit a message to some or all of the other user equipment devices (step 410) that have joined the session so that a corresponding adaptation may be made to the user's video, image or avatar displayed by those other user equipment devices. For example, where Team A has scored a point in the volleyball match shown in FIG. 3B, a message requesting an adaptation that celebrates that point, such as a fireworks background, or a filter showing a message supporting Team A, may be sent to a sub-group of the users. In an alternative embodiment, such a message may be sent to all of the user equipment devices, and the user equipment devices may then determine whether or not to apply the adaptation based, for example, on user profile information of their respective user indicating whether or not they support Team A and/or confirmation provided by the respective user in response to a prompt. In some embodiments, the message may identify a file or location of a file containing audio or video data for display or may include the file itself. The message may be, or include, a JavaScript Object Notation (JSON) format file.

The control circuitry then returns to the monitoring at step 404 until either another trigger is detected (step 406) or the session finishes (step 414), ending the process (step 416).

The foregoing description, for purposes of explanation, used specific nomenclature to provide a thorough understanding of the disclosure. However, it will be apparent to one skilled in the art that the specific details are not required to practice the methods and systems of the disclosure. For example, while many of the examples set out above refer to a group watch session, the methods and systems described may be used in other types of shared activity, such as a videocall, videoconference, multi-player game, screen-sharing session, audio call or message-based chat. The foregoing descriptions of specific embodiments of the present invention are, therefore, presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

This specification discloses embodiments which include, but are not limited to, the following:

1. A method comprising:
   receiving, using control circuitry of a user equipment device, media content for display in a shared activity session;
   receiving, using the control circuitry, additional content corresponding to respective users of one or more other user equipment devices participating in the shared activity session;
   generating for display, using the control circuitry, a display screen including the media content and at least a portion of the additional content;

during the shared activity session, automatically adapting the display of the additional content, using the control circuitry, based on the media content and/or the additional content.
2. The method of embodiment 1, wherein:
the additional content includes images corresponding to the users; and
adapting the display of the additional content comprises changing a background in the image of at least one of the users.
3. The method of embodiment 2, wherein changing the background comprises:
selecting a frame of the media content; and
replacing a background in the image of said at least one of the users with at least a portion of the selected frame.
4. The method of embodiment 1, wherein:
the additional content includes video images corresponding to the users; and
adapting the display of the additional content comprises applying a video filter to the video images of at least one of the users.
5. The method of embodiment 1, wherein:
the additional content includes an avatar corresponding to at least of the users; and
adapting the display of the additional content comprises applying a visual effect to the avatar corresponding to said at least one of the users and/or changing a display profile of said at least one of the users.
6. The method of embodiment 1, wherein:
the shared activity session includes a message-based chat;
the additional content comprises a chat message from one of the users; and
adapting the display of the additional content comprises changing display attributes of the chat message from said one of the users.
7. The method of embodiment 1, wherein automatically adapting the display of the additional content comprises:
selecting a visual effect based on the media content and/or metadata associated with the media content; and
generating for display the additional content with the visual effect applied thereto.
8. The method of embodiment 1, wherein automatically adapting the display of the additional content comprises:
selecting a visual effect based on audio data or text data provided by one of the users during the shared activity session; and
generating for display the additional content with the visual effect applied thereto.
9. The method of embodiment 1, wherein automatically adapting the display of the additional content comprises:
selecting a visual effect based on user profile information of at least one of the users; and
generating for display the additional content with the visual effect applied thereto.
10. The method of embodiment 1, wherein the shared activity session is one of:
a group watch session, wherein the media content is live media content;
a group watch session, wherein the media content is on-demand media content;
a videoconference session;
a screen-sharing session;
a video call;
an audio call; or
a message-based chat session.
11. A non-transitory computer readable medium on which are stored computer readable instructions to:
receive, using control circuitry of a user equipment device, media content for display in a shared activity session;
receive, using the control circuitry, additional content corresponding to respective users of one or more other user equipment devices participating in the shared activity session;
generate for display, using the control circuitry, a display screen including the media content and at least a portion of the additional content; and
during the shared activity session, automatically adapt the display of the additional content, using the control circuitry, based on the media content and/or additional content.
12. The non-transitory computer-readable medium of embodiment 11, on which are stored further computer-readable instructions to adapt the display of the additional content by changing a background in an image corresponding to at least one of the users.
13. The non-transitory computer-readable medium of embodiment 12, on which are stored further computer-readable instructions to change the background by:
selecting a frame of the media content; and
replacing a background in the image of said at least one of the users with at least a portion of the selected frame.
14. The non-transitory computer-readable medium of embodiment 11, on which are stored further computer-readable instructions to adapt the display of the additional content by generating for display video images of at least one of the users with a video filter applied thereto.
15. The non-transitory computer-readable medium of embodiment 11, on which are stored further computer-readable instructions to adapt the display of the additional content by generating for display an avatar corresponding to at least one of the users with a visual effect applied thereto and/or changing a display profile of said at least one of the users.
16. The non-transitory computer-readable medium of embodiment 11, on which are stored further computer-readable instructions to adapt the display of the additional content by changing display attributes of a chat message from one of the users.
17. The non-transitory computer-readable medium of embodiment 11, on which are stored further computer-readable instructions to adapt the display of the additional content by:
selecting a visual effect based on the media content and/or metadata associated with the media content; and
generating for display the additional content with the visual effect applied thereto.
18. The non-transitory computer-readable medium of embodiment 11, on which are stored further computer-readable instructions to adapt the display of the additional content by:
selecting a visual effect based on audio data or text data provided by one of the users during the shared activity session; and
generating for display the additional content with the visual effect applied thereto.
19. The non-transitory computer-readable medium of embodiment 11, on which are stored further computer-readable instructions to adapt the display of the additional content by:
selecting a visual effect based on user profile information of at least one of the users; and
generating for display the additional content with the visual effect applied thereto.

20. An apparatus comprising:
- a user equipment device comprising control circuitry configured to:
  - receive media content for display in a shared activity session;
  - receive additional content corresponding to respective users of one or more other user equipment devices participating in the shared activity session;
  - generate for display the media content and at least a portion of the additional content;
  - during the shared activity session, automatically adapt the display of the additional content based on the media content and/or the additional content.

21. The apparatus of embodiment 20, wherein the control circuitry is configured to adapt the display of the additional content by changing a background in an image corresponding to at least one of the users.

22. The apparatus of embodiment 21, wherein the control circuitry is configured to change the background by:
- selecting a frame of the media content; and
- replacing a background in the image of said at least one of the users with at least a portion of the selected frame.

23. The apparatus of embodiment 20, wherein the control circuitry is configured to adapt the display of the additional content by generating for display video images of at least one of the users with a video filter applied thereto.

24. The apparatus of embodiment 20, wherein the control circuitry is configured to adapt the display of the additional content by generating for display an avatar corresponding to at least one of the users with a visual effect applied thereto and/or changing a display profile of said at least one of the users.

25. The apparatus of embodiment 20, wherein the control circuitry is configured to adapt the display of the additional content by changing display attributes of a chat message from one of the users.

26. The apparatus of embodiment 20, wherein the control circuitry is configured to adapt the display of the additional content by:
- selecting a visual effect based on the media content and/or metadata associated with the media content; and
- generating for display the additional content with the visual effect applied thereto.

27. The apparatus of embodiment 20, wherein the control circuitry is configured to adapt the display of the additional content by:
- selecting a visual effect based on audio data or text data provided by one of the users during the shared activity session; and
- generating for display the additional content with the visual effect applied thereto.

28. The apparatus of embodiment 20, wherein the control circuitry is configured to adapt the display of the additional content by:
- selecting a visual effect based on user profile information of at least one of the users; and
- generating for display the additional content with the visual effect applied thereto.

29. A method comprising:
- receiving, using the control circuitry of a user equipment device, media content for display in a shared activity session;
- receiving, using the control circuitry, additional content corresponding to respective users of one or more other user equipment devices participating in the shared activity session;
- generating for display, using control circuitry, a display screen including the media content and at least a portion of the additional content;
- during the shared activity session, automatically adapting the display of the additional content using the control circuitry based on the media content and/or the additional content.

30. The method of embodiment 29, wherein:
- the additional content includes images corresponding to the users; and
- adapting the display of the additional content comprises changing a background in the image of at least one of the users.

31. The method of embodiment 30, wherein changing the background comprises:
- selecting a frame of the media content; and
- replacing a background in the image of said at least one of the users with at least a portion of the selected frame.

32. The method of embodiment 29, 30, or 31, wherein:
- the additional content includes video images corresponding to the users; and
- adapting the display of the additional content comprises applying a video filter to the video images of at least one of the users.

33. The method of embodiment 29, 30, or 31, wherein:
- the additional content includes an avatar corresponding to at least one of the users; and
- adapting the display of the additional content comprises applying a visual effect to the avatar corresponding to said at least one of the users and/or changing a display profile of said at least one of the users.

34. The method of any of embodiments 29-33, wherein:
- the shared activity session includes a message-based chat;
- the additional content comprises a chat message from one of the users; and
- adapting the display of the additional content comprises changing display attributes of the chat message from said one of the users.

35. The method of any of embodiments 29-34, wherein automatically adapting the display of the additional content comprises:
- selecting a visual effect based on the media content and/or metadata associated with the media content; and
- generating for display the additional content with the visual effect applied thereto.

36. The method of any of embodiments 29-34, wherein automatically adapting the display of the additional content comprises:
- selecting a visual effect based on audio data or text data provided by one of the users during the shared activity session; and
- generating for display the additional content with the visual effect applied thereto.

37. The method of any of embodiments 29-34, wherein automatically adapting the display of the additional content comprises:
- selecting a visual effect based on user profile information of at least one of the users; and
- generating for display the additional content with the visual effect applied thereto.

38. The method of any of embodiments 29-37, wherein the shared activity session is one of:
- a group watch session, wherein the media content is live media content;
- a group watch session, wherein the media content is on-demand media content;
- a videoconference session;

a screen-sharing session;
a video call;
an audio call; or
a message-based chat session.

39. A computer program comprising computer readable instructions that, when executed by one or more processors, causes the one or more processors to perform the method of any of embodiments 29-38.

40. An apparatus comprising:
a user equipment device comprising:
means for receiving media content for display in a shared activity session;
means for receiving additional content corresponding to respective users of one or more other user equipment devices participating in the shared activity session;
means for generating for display the media content and at least a portion of the additional content;
means for, during the shared activity session, automatically adapting the display of the additional content based on the media content and/or the additional content.

41. The apparatus of embodiment 40, wherein the means for automatically adapting the display of the additional content is configured to change a background in an image corresponding to at least one of the users.

42. The apparatus of embodiment 41, wherein the means for automatically adapting the display is configured to change the background by:
selecting a frame of the media content; and
replacing a background in the image of said at least one of the users with at least a portion of the selected frame.

43. The apparatus of embodiment 40, 41, or 42, wherein the means for automatically adapting the display of the additional content is configured to generate for display video images of at least one of the users with a video filter applied thereto.

44. The apparatus of any of embodiments 40-43, wherein the means for automatically adapting the display of the additional content is configured to generate for display an avatar corresponding to at least one of the users with a visual effect applied thereto and/or changing a display profile of said at least one of the users.

45. The apparatus of any of embodiments 40-44, wherein the means for automatically adapting the display of the additional content is configured to change display attributes of a chat message from one of the users.

46. The apparatus of any of embodiments 40-45, wherein the means for automatically adapting the display of the additional content is configured to adapt the display of the additional content by:
selecting a visual effect based on the media content and/or metadata associated with the media content; and
generating for display the additional content with the visual effect applied thereto.

47. The apparatus of any of embodiments 40-45, wherein the means for automatically adapting the display of the additional content is configured to adapt the display of the additional content by:
selecting a visual effect based on audio data or text data provided by one of the users during the shared activity session; and
generating for display the additional content with the visual effect applied thereto.

48. The apparatus of any of embodiments 40-45, wherein the means for automatically adapting the display of the additional content is configured to adapt the display of the additional content by:
selecting a visual effect based on user profile information of at least one of the users; and
generating for display the additional content with the visual effect applied thereto.

What is claimed is:

1. A method comprising:
receiving, using control circuitry of a user equipment device, media content for display in a group watch session, wherein the media content is a live sports event including a first team and a second team;
receiving, using the control circuitry, additional content corresponding to respective users of one or more other user equipment devices participating in the group watch session, wherein the additional content includes an image of each respective user, a first team badge associated with the first team, and a second team badge associated with the second time;
generating for display, using the control circuitry, a display screen including the media content and the image of each respective user;
accessing a user profile to determine a preference for the first team or the second team for each respective user;
in response to determining the preference for the first team or the second team for each respective user, automatically adapting the display using the control circuitry to include the first team badge or the second team badge with the image of the respective user based on the preference;
detecting a goal involving the first team or the second team; and
in response to detecting the goal involving the first team or the second team, during the group watch session, automatically adapting the display of the additional content, using the control circuitry, to include content related to the detected goal.

2. The method of claim 1, wherein:
the additional content includes images corresponding to the users; and
adapting the display of the additional content comprises changing a background in the image corresponding to at least one of the users.

3. The method of claim 2, wherein changing the background comprises:
selecting a frame of the media content; and
replacing a background in the image corresponding to said at least one of the users with at least a portion of the selected frame.

4. The method of claim 1, wherein:
the additional content includes video images corresponding to the users; and
adapting the display of the additional content comprises applying a video filter to the video images of at least one of the users.

5. The method of claim 1, wherein:
the additional content includes an avatar corresponding to at least one of the users; and
adapting the display of the additional content comprises applying a visual effect to the image corresponding to said at least one of the users and/or changing a display profile of said at least one of the users.

6. The method of claim 1, wherein:
the group watch session includes a message-based chat;

the additional content comprises a chat message from one of the users; and adapting the display of the additional content comprises changing display attributes of the chat message from said one of the users.

7. The method of claim 1, wherein automatically adapting the display of the additional content comprises:

selecting a visual effect based on the media content and/or metadata associated with the media content; and generating for display the additional content with the visual effect applied thereto.

8. The method of claim 1, wherein automatically adapting the display of the additional content comprises:

selecting a visual effect based on audio data or text data provided by one of the users during the group watch session; and generating for display the additional content with the visual effect applied thereto.

9. The method of claim 1, wherein automatically adapting the additional content comprises: selecting a visual effect based on user profile information of at least one of the users; and generating for display the additional content with the visual effect applied thereto.

10. A non-transitory computer-readable medium on which is stored computer-readable instructions to:

receive, using control circuitry of a user equipment device, media content for display in a group watch session, wherein the media content is a live sports event including a first team and a second team;

receive, using the control circuitry, additional content corresponding to respective users of one or more other user equipment devices participating in the group watch session, wherein the additional content includes an image of each respective user;

generate for display, using the control circuitry, a display screen including the media content and the image of each respective user;

access a user profile to determine a preference for the first team or the second team for each respective user;

in response to determining the preference for the first team or the second team for each respective user, automatically adapt the display using the control circuitry to include the first team badge or the second team badge with the image of the respective user based on the preference;

detect a goal involving the first team or the second team; and in response to detecting the goal involving the first team or the second team, during the group watch session, automatically adapt the display of the additional content, using the control circuitry, to include content related to the detected goal.

11. An apparatus comprising:

a user equipment device comprising control circuitry configured to:

receive media content for display in a group watch session, wherein the media content is a live sports event including a first team and a second team;

receive additional content corresponding to respective users of one or more other user equipment devices participating in the group watch session, wherein the additional content includes an image of each respective user;

generate for display the media content and the image of each respective user;

access a user profile to determine a preference for the first team or the second team for each respective user;

in response to determining the preference for the first team or the second team for each respective user, automatically adapt the display using the control circuitry to include the first team badge or the second team badge with the image of the respective user based on the preference;

detect a goal involving the first team or the second team; and in response to detecting the goal involving the first team or the second team, during the group watch session, automatically adapt the display of the additional content to include content related to the detected goal.

12. The apparatus of claim 11, wherein the control circuitry is configured to adapt the display of the additional content by changing a background in an image corresponding to at least one of the users.

13. The apparatus of claim 12, wherein the control circuitry is configured to change the background by:

selecting a frame of the media content; and replacing a background in the image of said at least one of the users with at least a portion of the selected frame.

14. The apparatus of claim 11, wherein the control circuitry is configured to adapt the display of the additional content by generating for display video images of at least one of the users with a video filter applied thereto.

15. The apparatus of claim 11, wherein the control circuitry is configured to adapt the display of the additional content by generating for display an avatar corresponding to at least one of the users with a visual effect applied thereto and/or changing a display profile of said at least one of the users.

16. The apparatus of claim 11, wherein the control circuitry is configured to adapt the display of the additional content by changing display attributes of a chat message from one of the users.

17. The apparatus of claim 11, wherein the control circuitry is configured to adapt the display of the additional content by:

selecting a visual effect based on the media content and/or metadata associated with the media content; and generating for display the additional content with the visual effect applied thereto.

18. The apparatus of claim 11, wherein the control circuitry is configured to adapt the display of the additional content by:

selecting a visual effect based on audio data or text data provided by one of the users during the group watch session; and generating for display the additional content with the visual effect applied thereto.

19. The apparatus of claim 11, wherein the control circuitry is configured to adapt the display of the additional content by:

selecting a visual effect based on user profile information of at least one of the users; and generating for display the additional content with the visual effect applied thereto.

* * * * *